United States Patent [19]

Antrim et al.

[11] Patent Number: 4,948,619
[45] Date of Patent: Aug. 14, 1990

[54] NATURAL ANTIOXIDANT SYSTEM FOR CEREALS

[75] Inventors: Richard L. Antrim; James B. Taylor, both of Sparta, N.J.

[73] Assignee: Nabisco Brands, Inc., East Hanover, N.J.

[21] Appl. No.: 342,880

[22] Filed: Apr. 25, 1989

[51] Int. Cl.$^5$ .................................................. A23B 9/00
[52] U.S. Cl. .................................... 426/610; 426/331; 426/542; 426/543
[58] Field of Search ................. 426/331, 542, 543, 610

[56] References Cited

U.S. PATENT DOCUMENTS

| | | | |
|---|---|---|---|
| 2,174,982 | 10/1939 | Kellog | 99/80 |
| 2,289,416 | 7/1942 | Fine et al. | 99/83 |
| 2,693,419 | 11/1954 | Gager | 99/83 |
| 3,208,855 | 9/1965 | Enoch et al. | 99/90 |
| 3,222,189 | 12/1965 | Perrozzi | 99/172 |
| 3,608,085 | 9/1971 | Papworth | 426/331 |
| 3,655,401 | 4/1972 | Halik | 99/85 |
| 3,667,964 | 6/1972 | Frankenfeld et al. | 99/90 |
| 3,784,710 | 1/1974 | Earle et al. | 426/128 |
| 3,895,121 | 7/1975 | Huessy | 426/465 |
| 3,908,031 | 9/1975 | Wistreich et al. | 426/335 |
| 3,914,445 | 10/1975 | Pavey | 426/326 |
| 3,956,511 | 5/1976 | Mitchell et al. | 426/106 |
| 3,996,386 | 12/1976 | Malkki et al. | 426/331 |
| 4,004,035 | 1/1977 | Hirzel et al. | 426/275 |
| 4,208,476 | 6/1980 | Tsao | 426/549 |
| 4,381,315 | 4/1983 | Yong et al. | 426/94 |
| 4,526,801 | 7/1985 | Atwell | 426/128 |
| 4,540,590 | 9/1985 | Harada et al. | 426/324 |
| 4,582,711 | 4/1986 | Durst | 426/128 |
| 4,696,825 | 9/1987 | Leibfred | 426/283 |
| 4,764,388 | 8/1988 | Sullivan et al. | 426/620 |
| 4,795,647 | 1/1989 | Leibfred | 426/560 |

FOREIGN PATENT DOCUMENTS

| | | |
|---|---|---|
| 699278 | 4/1964 | Canada . |
| 47938 | 4/1977 | Japan . |
| 133480 | 10/1980 | Japan . |
| 11169 | 1/1984 | Japan . |
| 54650 | 3/1985 | Japan . |
| 83531 | 5/1985 | Japan . |
| 1286 | of 1857 | United Kingdom . |

OTHER PUBLICATIONS

Matz, Samuel A., "Cereal Technology", The AVI Publishing Co., Inc., (1970), pages 231 to 235.
Spoon Sized Shredded Wheat, Nabisco Brands, Inc. (1986).
Fritsch and Grale, J. Amer. Oil Chemists Co., 54:255 (1977).

*Primary Examiner*—Donald E. Czaja
*Assistant Examiner*—Helen Pratt

[57] ABSTRACT

The process of treating baked shredded wheat with a solvent spray using a potable solvent, preferably ethanol. The solvent is subsequently evaporated from the treated shredded wheat. The treatment retards the oxidation of the oil in the shredded wheat, which consequentially, substantially slows down rancification of such oil. In this manner, the shelf-stability of the shredded wheat product is significantly extended.

27 Claims, No Drawings

NATURAL ANTIOXIDANT SYSTEM FOR CEREALS

BACKGROUND OF THE INVENTION

1. Field Of The Invention

The invention relates to the treatment of baked shredded wheat to increase its shelf stability. The invention also relates to the treatment of baked shredded wheat to retard the oxidation and subsequent rancification of the oil in the baked shredded wheat. The invention also relates to the treated, baked shredded wheat.

2. Background Art

The manufacture of shredded wheat biscuits is disclosed in Matz, Samuel A., "Cereal Technology", The Avi Publishing Company, Inc., Conn., (1970), pages 231 to 235. Shredded wheat biscuits differ from most other prepared breakfast cereals in that they are made from whole grain without the addition of any flavor and without the removal of the germ or bran.

U.S. Pat. No. 2,174,982 discloses a process for making shredded or flaked cereal foods from cereal grains, such as, wheat, rye, corn or oats.

U.S. Pat. No. 2,289,416 discloses a process of a flaked or shredded cereal from whole grain.

To help preserve the natural wheat flavor in the SPOON SIZE® Shredded Wheat marketed by Nabisco Brands, Inc., (1986 copyright) butylated hydroxytoluene is added to the packaging material.

U.S. Pat. No. 2,069,265 discloses a method of inhibiting rancidity in fats and oils normally subjected to rancidity. The process includes mixing a refined glyceride fat and oil subject to rancidity with a small percentage of an oil-containing seed including anti-rancidity constituents sufficient to inhibit substantial rancidity in such glyceride, producing a direct infusion of the seed in the glyceride, and separating the treated glyceride from the seed fibers.

U.S. Pat. No. 3,208,855 discloses preparing bakery products, such as, cakes, crackers, sweet goods and bread, wherein alcohol is incorporated in the dough. The bread is said to have outstanding characteristics of flavor and appearance. The ethanol allowed better control over the bread production process, for example, the ethanol had an inhibiting effect upon yeast growth. Prolonged shelf life was achieved by the Pat. No. '855 process, but such was not attributed to the ethanol inclusion.

U.S. Pat. No. 3,222,189 discloses a convenience food article including a dough admixture comprising water-washed starch, water-washed gluten, water and a sufficient quantity of ethyl alcohol to improve shelf-stability and quality of the food article. The ethyl alcohol is not in excess of about 60 percent of the total liquid in the dough. There is a container impervious to alcohol-vapor with the dough admixture sealed therewithin. While it is, of course, well known that ethyl alcohol may be used as a preservative for some purposes, it has been found that ethyl alcohol cannot be used to preserve dough or batter products for any length of time under ambient conditions.

U.S. Pat. No. 3,655,401 discloses a process of producing shelf stable dehydrated rehydratable pasta products having greater than usual moisture contents, by cooking the pasta products in a solution comprising polyhydric alcohols, salts and an antimycotic. The expression "polyhydric alcohol" refers to alcohols with two or more hydroxyl groups, most typically such alcohols as glycerol, propylene glycol, sorbitol, mannitol and mixtures thereof. However, the expression "contemplated in this invention" also includes a variety of sugar alcohols which may be classed by the number of hydroxyl groups and the general formula $HOCH(CHOH)_n CHOH$, where n has values from 2 to 5, such as tetritols, penitols, hexitols, heptitols, etc., as well as stereoisomers thereof.

U.S. Pat. No. 3,667,964 discloses baked food additives which comprise certain esters of polyalcohols, such as, esters of 1,3-diols and 1,3,5,x-polyols, are dough conditioners, anti-staling agents and preservatives.

U.S. Pat. No. 3,784,710 discloses a liquid, ready-to-use batter mixture which is chemically and bacteriologically stable. In addition to conventional batter components such as flour, water, shortening and flavoring, the batters contain effective amounts of ethyl alcohol to prohibit bacterial growth in the mixture at room temperature. The amounts of ethyl alcohol are also effective to prevent an increase of viscosity of the mixture by controlling the swelling of the flour by the water. Pat. No. '710 also discloses a food convenience product having a batter disposed in a container that is impervious to alcohol vapor wherein sufficient amounts of ethyl alcohol are present to inhibit bacterial growth in the mixture at room temperature so that the mixture is suitable for human consumption.

U.S. Pat. No. 3,895,121 discloses the stabilization of wheat germ by conversion into a stable, palatable food product through combined operations of mechanical homogenization and subsequent heat treatment. The raw wheat germ is initially homogenized and plasticized by confined exposure to elevated temperatures and pressures while being extruded into a cohesive sheet or ribbon. Thereafter, the extrudate is preferably crushed to reduce the particle size and thereafter is subjected to a dry heat treating operation wherein the temperature is raised to the range of about 400° F., which modified surface oils and moisture, with the surface residue encapsulating certain components in the matrix so as to sharply retard rancidification.

U.S. Pat. No. 3,908,031 discloses a method for sterilizing foods and food products, such as, natural spices, hydrogenated fats, grain and grain flours (e.g., wheat) and dehydrated or partially dehydrated fruits. The method includes contacting the material with ethanol in the vapor phase maintained at a temperature within the range of 78° to 150° C. for a time sufficient to reduce the bacteria load of the product, and separating the sterilized product from the vapor. The method of Pat. No. '031 is particularly well suited for the treatment and sterilization of a variety of natural spices including peppers (e.g., black pepper), nutmeg, cloves and the like. Because ethanol does not form an azeotrope rich with the volatile oils contained in the essence of such natural spices, the ethanol does not result in the loss of such oils as is the case with steam. Example 5 shows wheat flour being contacted with ethanol vapor at 211° F. and 20 psi.

Pat. No. '031 states that it was surprisingly found that ethanol vapor is more effective as a sterilizing medium than heat or ethanol in the liquid phase. Example 1 of Pat. No. '031 treats regular brown black pepper with ethanol in the vapor phase, with heat and with liquid ethanol (95 percent). Heat provided better sterilization than liquid ethanol.

U.S. Pat. No. 3,914,445 discloses the use of 3 to 8 percent of edible humectants, such as, glycerol, in formulated, ready-to-eat, food compositions of intermediate moisture range. The food compositions are shelf stable.

U.S. Pat. No. 3,956,511 discloses flowable dextrin powders containing about 30 to 60 percent of ethanol sorbed therein which are prepared by sorption of an aqueous alcohol solution with particulates of expanded dextrin having a bulk density of from 0.05 to 0.30 grams/cubic centimeter, a dextrose equivalent of from 5 to 15 and a moisture content of 2 to 6 percent. The powders are stable when hermetically packaged. It is recognized that most carbohydrate materials have the capability of sorbing relatively small amounts of ethanol.

U.S. Pat. No. 4,208,476 discloses extruding doughs to prepare food products. The doughs can include, for example, vegetable protein sources such as wheat germ and wheat germ meal. If semi-moist pet foods are prepared, polyhydric alcohols can be incorporated in the dough to stabilize the product by preventing microbiological growth.

U.S. Pat. No. 4,381,315 discloses the inclusion of an edible alcohol, e.g., ethanol, in refrigerated dough.

U.S. Pat. No. 4,526,801 discloses a refrigerated dough which contains a volatilizable edible substance, e.g., ethanol, having a vaporization temperature of less than about 200° F. and a packed specific volume of greater than about 1.25 cc/gm. The dough provides higher specific volumes upon baking. The dough is at least partially chemically leavened and is adapted for containment in a container for storage under refrigerated conditions.

U.S. Pat. No. 4,540,590 discloses a process of preparing rapid-cooking pasta from a dough of wheat and water. To further improve the keeping quality of the pastas, an alcohol, such as, ethanol, propylene glycol, an organic acid, glycine and/or sodium chloride can be added to the dough. In Table 1 the addition of 2 weight percent of ethanol by itself resulted in 90 days of storage without any deterioration in palatability.

U.S. Pat. No. 4,582,711 discloses ready-to-eat baked goods which are of high quality and are shelf stable for up to one year. The baked goods are prepared from doughs containing base-batter mix, water, sugar and at least 5 percent by weight of an edible, liquid polyhydric alcohol, such as, glycerine.

British Patent No. 1286/1857 discloses applying anesthetic agents, such as, ethers, chloroform and sulfuret of carbon, to corn, other grains and alimentary substances to destroy insects which attack them and by retarding or preventing fermentation. The substances to be treated are placed in closed vessels or chambers and then the preservation agent is introduced in the liquid or vapor state. For dry grain, a twenty-four hour exposure sufficed to destroy any insects; and it was stated that the treated grain was susceptible of being preserved in the closed chamber until required for use.

Canadian Patent No. 699,278 discloses a method of preserving grain, seeds, bulbs, tubers, meat, fish, cereal products and other foodstuffs against attacks by insect infestation, such as, weevils, or by mildew and similar fungal attack forming a heap thereof in ships' holds, silos and other containers and spraying at least one of the surface of such heap and the upper internal surface of the container with ethyl alcohol. The amount of alcohol is relatively small, say one quart to every three or four bushels of grain. The ethanol evaporates in the container. Canadian No. '278 states that by research and experience it was found that grains, seeds and cereal products may be preserved for substantial periods against insect and fungal attack if they are kept in an atmosphere containing the vapor of ethyl alcohol, so its invention comprises storing such materials in such manner. The storage is done in sealed containers or under plastic sheets, for example, in order to maintain the solvent-vapor atmosphere. If the grain or other foodstuffs or substances being preserved are in a container proof against entry of insects or fungi it is not necessary to maintain the alcohol vapor therein during the entire period of storage. Thus, for example, grain in a sealed silo may be sprayed with alcohol all traces of which vanish after a year, but the grain is preserved for four years or longer. The use of methylated ethanol is also disclosed. Besides grain, various cereal products such as corn flakes, bran, grits and the like, may be treated in the same manner. Wheat and shredded wheat are not specifically mentioned in Canadian No. '278. Canadian No. '278 states that it is not practicable to treat flour or other finely powdered products in this way without special precautions, because the material cakes and the alcohol vapor does not penetrate fully therethrough.

Canadian No. '278 discloses that it is known that immersion of animal or vegetable materials in alcohol will preserve them and museum specimens are often preserved in this way. But such preservation would not only be exceedingly expensive if applied upon a large scale, but would defeat its own ends in that the grain or other material is hardened by the alcohol and rendered indigestible. By the method of Canadian No. '278, in which the preservation is carried out primarily by alcohol vapor, the grain or other material is not hardened or rendered indigestible or unpalatable.

Japanese Published Patent Application No. 52-047938 discloses preparing a dry alpha-starch preparation by immersing boiled rice in water or an aqueous ethanol solution, drying the rice and rapidly heating the starch to 160° to 300° C. within minutes for swelling and dehydrating. The alpha-starch has a high preservation property Japanese Published Patent Application No. 55-133480 discloses antioxidant compositions for the preventing of the oxidation of vegetable oils, such as, purified palm oil, animal oils and marine product oils. The antioxidant composition contains tocopherol, gallic acid, ethyl alcohol and triglyceride having intermediate chain length.

Japanese Published Patent Application No. 59-011169 discloses sterilizing foodstuff by absorbing ethanol on its surface by contacting it with ethanol vapor or liquid ethanol at relatively low temperature for, say, 5 to 20 minutes (a standing period). The foodstuff is then contacted with superheated ethanol vapor (say, 90° to 170° C.) under atmospheric pressure (for, say, 2 to 20 minutes) to evaporate ethanol from the surface of the foodstuff. The concentration of the ethanol in the superheated vapor is preferably about 95 v/v percent. Examples of the foodstuffs sterilized are cereals and noodles.

Japanese Published Patent Application No. 60-054650 discloses preparing a rice preparation by treating polished rice with ethanol at 55° to 60° C. for 10 to 15 minutes and then drying the treated rice to remove ethanol. The process removes rice bran and rice bran oil remaining on the surface of the polished rice. The treated rice easily absorbs water.

Japanese Published Patent Application No. 60-083531 discloses preparing nutritious pickles using a mixture of ume extract (containing vinegar) and ethanol. The vinegar and ethanol readily penetrate the raw vegetable.

BROAD DESCRIPTION OF THE INVENTION

An object of the invention is to provide a process for treating shredded wheat whereby the shelf stability thereof, particularly at ambient conditions, is substantially extended. Another is to provide shredded wheat with substantially extended shelf stability. Another object of the invention is to provide a process for preparing a cooked wheat in shredded form with improved shelf stability. A further object of the invention is to provide a process for the preparation of shredded wheat breakfast cereals with improved shelf stability.

The invention involves a process for the preparation of shredded, cooked, farinaceous cereal products, particularly shredded cooked wheat products. The invention process includes:

(a) treating baked, farinaceous cereal in shredded form with a potable, anhydrous solvent; and (b) evaporating the solvent from the baked, shredded, farinaceous cereal. The solvent treatment apparently retards the oxidation of the oils in the shredded wheat, with the result that rancification of the shredded wheat is retarded. The invention process is preferably conducted using ethanol as the solvent and using baked shredded wheat as the baked shredded cereal. The moisture content after the evaporation step is 15 percent or less.

While not meaning to be bound by any particular theory, it is believed that the retardation of the oxidation of the oil in the baked shredded wheat is caused by the solvent-induced migration of the oil from the surface to the interior of the shreds. The nutritional values of the shredded wheat product are not adversely affected by the solvent treatment.

The baked shredded cereal biscuits or shreds can be prepared by any conventional or useful method. A convenient method for preparing shredded wheat involves: cooking whole wheat berries with water to at least partially gelatinize the wheat starch; tempering the cooked wheat berries for a sufficient period of time to retrograde a substantial portion of the starch in the berries; forming the tempered wheat berries into a shredded form; and baking or toasting the shredded wheat. Any other suitable whole, farinaceous cereal grain can be used in place of the whole wheat grain (berries). Mixtures of whole, farinaceous cereal grains can be used. In the process the grains are deformed from their discrete shapes into shreds. The starch provides formability of the grains into the ready-to-eat breakfast shredded (wheat) cereals. Starch is generally needed for its matrix forming abilities so the grain can be deformed, blended, and conformed into ready-to-eat shredded (wheat) cereals.

The shredded wheat biscuits or shredded cereal biscuits are made from whole grain without, usually, the addition of any flavor and without the removal of the germ or bran. The whole wheat berries are cooked in the presence of water to at least partially gelatinize the starch. The degree of gelatinization is typically complete. The cooking can be as little as 15 minutes or as long as an hour or more, with a period of about 30 minutes being preferred. The cooking is preferably done in boiling water at atmospheric pressure. The cooking can be done at atmospheric pressure, lower pressure or higher pressure. The whole wheat berries or kernels are very soft. The moisture content after cooking may be as high as about 60 percent, although it is preferably about 50 percent, and normally should not be less than about 45 percent. Some preliminary drying in louver ovens can be done at this time, but the whole wheat should not be brought much below 45 to 50 percent of moisture. The tempering step of the cereal berries is conventionally up to about 48 hours, typically from about 16 to about 48 hours. The tempering is preferably done in stainless steel bins or other stainless steel containers.

The tempered product is then drained, and formed into shredded breakfast cereal. Any suitable or conventional shredding equipment can be used. After being formed, the shredded wheat biscuits are toasted or baked using any suitable or conventional toasting or baking equipment. The moisture content is usually less than 15 percent.

The invention also involves shredded, baked, dry, farinaceous cereal product, particularly baked, dry, shredded wheat, having increased shelf life. The invention baked shredded cereal product has been subjected to the invention process. The invention shredded product has reduced rancification over a period of time compared to commercial shredded product. The solvent treatment of the baked shredded wheat, while it may have some sterilization effects, has the surprising result of significantly increasing the shelf life of such baked shredded wheat by the herein described oil migration. The invention production can be stored at room temperature without the use of a conventional antioxidant. The shelf or product stability for the shredded wheat is not merely the result of the substantial total inhibition of harmful and bacteriological growth. The invention product can be termed a nonperishable processed food as it is not subject to rapid decay or deterioration that would render it unfit for human consumption. The moisture content is usually less than 15 percent.

The process of the invention gives significant antioxidant protection to the invention product.

DETAILED DESCRIPTION OF THE INVENTION

As used herein, all percentages, ratios, parts and proportions are on weight basis unless otherwise stated herein or otherwise obvious here from to one skilled in the art. As used herein, all temperatures are in degrees Fahrenheit unless otherwise stated herein or otherwise obvious herefrom to one skilled in the art.

The invention relates preferably to wheat, but also includes other cereal (farinaceous) grains suitable for food within its scope. Other suitable cereal grains include oats, rice, corn, barley, buckwheat, sorghum, millet, rye, combinations thereof, and the like. Mixtures of farinaceous cereal grains can be used.

The following description of the invention deals primarily with wheat but applies generally to any useful farinaceous cereal grains.

The shredded wheat is preferably prepared starting with whole wheat berries. The whole wheat berries should generally contain at least 10 percent by weight of wheat starch, suitable from about 25 to about 45 percent by weight, on a dry weight basis. Whole wheat grain which has been slightly crushed or "bumped" so as to break the bran coat of each grain but not destroy their unitary nature can be used.

The whole wheat berries are cooked in the presence of water to at least partially gelatinize the starch. The degree of gelatinization is typically complete. By complete gelatinization it is meant that there is a complete absence of birefringence and complete absence of enthalpy of gelatination by differential scanning calorimetry.

Cooking temperatures generally range from about 176° F. (80° C.) to about 212° F. (100° C.). Cooking times generally range from about 15 to about 45 minutes. The pH during presoaking or cooking is suitably from about 2.0 to about 6. Generally the cooking times and temperatures should be sufficient to completely eliminate white centers or to leave only faint white centers in the whole wheat berries.

The amount of water used during cooking is preferably limited so that at least substantially all of the water is absorbed by the whole wheat berries. Suitably, the amount of water used during cooking ranges from about 20 to about 55 percent by weight, based upon the total weight of water and whole wheat berries. After cooking, any additional water remaining is usually drained off.

After being cooked, the cooked wheat berries are tempered for a sufficient period of time to retrograde a substantial portion of the starch in such berries. Suitably the tempering is conducted for 24 hours or less, typically for 10 to 18 hours, preferably 14 to 16 hours. There must be sufficient time for sufficient retrogradation to occur. Tempering of the whole wheat berries occurs after cooking. During the tempering of the drained, whole wheat berries, water is distributed substantially uniformly throughout the whole wheat berries prior to forming.

After being tempered, the tempered, whole wheat berries are formed into shredded breakfast cereal shapes by using conventional mass production cereal processing equipment.

In the production of a ready-to-eat shredded wheat biscuit, suitable moisture contents of the whole wheat berries for shredding range from about 28 to about 49 percent by weight, more typically from about 39 to about 43 percent by weight, based upon the weight of the whole wheat berries. The cooked, tempered, whole wheat berries are transferred, suitably by means of belt conveyors, to a hopper which feeds a screw conveyor. The latter transfers the whole wheat berries to a series of shredding rolls or mills via flow tubes or hoppers.

The formation of square, rectangular or triangular shredded wheat biscuits is described as follows. The shredding mills comprise a pair of rolls that rotate in opposite directions. One of the rolls has circumferential grooves and crosshatching grooves which are transverse to the circumferential grooves for the production of an integral net-like sheet. The spacing between the rolls is preferably controlled so as to avoid the production of webbing. Upon passing between the rolls, the whole wheat berries are deformed into the circumferential grooves and the crosshatching grooves. Each pair of rolls produces a wheat dough layer having a plurality of generally parallel longitudinal strands and a plurality of crosshatchings generally perpendicular to the strands. The longitudinal strands are produced by the circumferential grooves and run in parallel with the direction of movement of an underlying conveyor. The crosshatchings of the wheat dough layer are produced by the crosshatching grooves and run generally perpendicular to the direction of movement of the conveyor.

The shredding mills are arranged in a linear series along the common underlying conveyor. Each of the shredded wheat dough layers or sheets are deposited on the conveyor in superposition, with their longitudinal strands running in the same direction.

The shredded wheat dough layers are continuously laminated. The laminate is cut transversely and longitudinally to the direction of flow of the product into multiple lines of biscuit preforms using known cutting devices. The cutting can be completely through the laminate to form the individual biscuit shapes prior to baking or toasting. However, cutting partially through the filled laminate to form biscuit shapes, followed by baking and separating the baked partially cut laminate into individual biscuits in known manner is preferred. This procedure provides easier control of the orientation of a cut product as it passes through the oven.

The shredding rolls are usually from 6 to 8 inches in diameter and as wide as the finished biscuit is to be and, thus, are much smaller than flaking rolls. On one of the pair of rolls is a series of about 20 shallow corrugations running around the periphery. In cross section, these corrugations may be rectangular, triangular, or a combination of these shapes. The other roll of the pair is smooth. Soft cooked wheat is drawn between these rollers as they rotate, and issues as continuous strands of dough.

Biscuits are built up by layering strands on a moving belt which passes under sets of rolls working in tandem. Ten to 18 rolls may be used for circular biscuits, while 22 rolls is a common number for rectangular biscuits. In the latter case, layered strands are separated into biscuits by passing them below blunt knives which fuse a thin line of the dough into a solid mass at regular intervals.

The tempering step allows for sufficient starch retrogradation and equilibration of moisture so that the grain on shredding forms continuous, straight, non-sticky, semi-elastic strands. Retrogradation is the crystallization that occurs in gelatinized starch upon cooling. Insufficient tempering results in curled, sticky, and broken webs upon shredding.

After being formed, the shredded wheat berries are conventionally baked or toasted, followed by toasting and drying steps. For example, in the production of a shredded biscuit product, the cut laminate can be dried, baked and toasted in conventional equipment. Suitable ovens for drying, baking and toasting the laminate include Proctor and Schwartz, Werner-Lehara and Spooner ovens containing forced air and gas fired burners and a conveyor. Temperature profiles used in the oven for the drying, baking and toasting of the biscuit preforms are generally within the range of about 200° F. to about 600° F. Temperatures within this range are generally suitable for total enzyme inactivation. The total time for drying, baking and toasting should be such so as to avoid excessive browning. Suitable times for drying, baking and toasting will depend upon matters such as product thickness, product size and oven type. Suitable times generally range from about 4 to about 10 minutes. The dried, baked shredded wheat has a moisture content of less than 16 percent, preferably about 10 to about 13 percent.

In some operations, the forming and baking/toasting steps occur simultaneously, or nearly simultaneously, in the same equipment.

The formation of bite-sized shredded breakfast cereals is described as follows: A triple shredding mill is used for producing bit-sized breakfast cereals. Dough made from wheat, corn or rice, for example, is fed to long, water-cooled shredding rolls. These rolls deposit a shredded dough sheet onto a constant speed conveyor to form a wide, three-layer ribbon. The rolls on the first and third shredding mills extrude dough sheets with a laced pattern, due to the presence of smooth and grooved rolls. The middle set of rolls revolves at higher speed than the other two sets. As a result, the dough sheet in the middle folds as it falls onto the relatively slow moving conveyor belt covered by the first sheet. Sugar can be sprinkled over the middle dough sheet, and the top sheet is added. The combined structure passes between scoring rolls, and the baked cereal is finally broken along scored lines to form individual bit-sized pieces.

The formation of circular shredded wheat biscuits is described as follows: One end of the sheet formed from layered strands of whole wheat dough is caught up by a smooth roll which rotates just above the belt. This roll turns the layer of strands back upon itself, and the forward motion of the belt, combined with the reverse and upward motion of the cylinder surface, causes the layer to roll up into a circular biscuit. As the biscuit reaches the proper size, a knife chops down on the belt, severing the strands so that the former biscuit is released. Automatic controls vary the speed of the belt as the diameter of the biscuit increases. The completed disk falls into a cup from which it is transferred to a belt leading to the ovens. Since the biscuits are formed from dough of relative high moisture content, they are quite tender, and must be handled very carefully to prevent distortion. In practice, this means that the transfer steps must proceed relatively slowly. The wet biscuits are placed on a metal belt moving through a high temperature gas-fired oven. After 10 to 15 minutes, the outside of the product is dry and toasted while the interior is still wet. Then the biscuits are transferred to another hot air oven (or to a different section of the same oven) where they are dried, for example, at 250° F. for 30 to 60 minutes for a time depending upon the size and the air flow. Finished moisture content is usually about 11 percent. The combination of heat treatments causes the biscuit to assume the familiar oval cross section as a result of differential shrinkage of the layers.

The invention also includes the production of shredded cereal biscuits which are filled with paste, fruit, nuts, raisins, partially-dehydrated honey, partially-dehydrated fructose syrup and/or the like. The production of shredded cereal products having a fruit paste filling is taught in U.S. Pat. Nos. 2,693,419, 4,004,035 and 4,696,825. The pertinent portions of U.S. Pat. Nos. 2,693,419, 4,004,035 and 4,696,825 are incorporated herein by reference, as modified by the process of the invention.

According to U.S. Pat. No. 2,693,419, dried fruit or the like is enclosed within cereal shreds to provide a product wherein the cereal and dried fruit are essentially integral. The shredded product is prepared by depositing layers of moist, cooked shreds on top of each other in the process of U.S. Pat. No. 2,693,419. Usually after about half of the shred layers have been laid down, the fruit is deposited on the shreds and the remainder of the shred layers are laid down on top of the fruit. The shreds, it is taught, may be produced by means of a shredding machine comprised of a series of shredding heads, each of which consist of a pair of rolls revolving toward each other. The cereal elements are forced between the rolls and into the grooves contained therein to drop in a continuous flow of shreds onto a conveyor belt situated beneath the shredding machine.

U.S. Pat. No. 4,004,035 teaches the production of a shredded biscuit having a lapped zig-zag configuration in which the shreds are disposed on an angle relative to the sides and end of the biscuits and the shreds of individual layers are disposed on opposite or crossing angles. The biscuit, it is taught, is more rugged than a conventional biscuit which is produced using shredding mills which are arranged in a linear series across a common conveyor, with the shreds running longitudinally or in parallel with the direction of movement of the conveyor. In the process of U.S. Pat. No. 4,004,035, the addition of a second lapping device allows the introduction of a flavoring filling between the laps, resulting in a filled shredded biscuit having a lapped zig-zag configuration. Each lapping device is fed by one or more conventional shredding mills comprising a pair of closely spaced rolls wherein preferably one of the rolls has a smooth circumference and the other has a grooved circumference.

The U.S. Pat. No. 4,696,825 discloses a process for the continuous production of microbially shelf-stable paste-filled shredded cereal biscuits having an extended shelf-stable plurality of textures. A first plurality of net-like sheets of cereal dough are continuously laminated, followed by continuous depositing of at least one extrudate rope filling upon the first plurality of net-like sheets. A second plurality of net-like sheets is continuously laminated upon the at least one extrudate rope to obtain a filled laminate. Each of the net-like sheets has a plurality of generally parallel longitudinal strands and a plurality of crosshatchings which are generally perpendicular to the longitudinal strands. The filled laminate is cut to enrobe the filling and the product is baked. The number of crosshatchings of the net-like sheets adjacent to the filling is greater than the number of crosshatchings of the net-like sheets which are further removed from the filling.

The fillings used in the filled shredded can be a fruit paste filling, a meat filling, a cheese filling, or the like which is not adversely affected by the baking of the biscuit portion. Meat fillings and cheese fillings are intended for products to be eaten as a snack whereas fruit paste fillings are intended for ready-to-eat breakfast cereals or as snacks. Exemplary of fruit paste fillings which can be used are raisin paste fillings, strawberry, apple, apricot, banana, fig, peach, pear, prune, and mixtures thereof. They may include seasonings such as cinnamon or the like. The fillings may contain artificial and/or natural flavorings, and nuts.

The filling should be formulated to provide a microbially shelf stable product having a water activity of less than about 0.7. Pastes having a water activity of less than about 0.6 prior to baking are preferred so as to assure the attainment of a microbially safe baked product and to inhibit moisture migration to the baked dough layers.

The filling should provide an impression of moistness and be soft and chewy in the baked product under proper packaging and storage conditions. Fruit paste fillings comprising dehydrated fruit and glycerin or other edible humectant polyols and/or sugars may be used. Glycerin levels ranging from about 5 to about 25 percent, preferably from about 8 to about 12 percent by weight, based upon the total weight of the filling have been found to provide a desirable moist, soft or chewy texture in the baked product without adversely affecting taste. Suitable fruit paste fillings typically have a water content of at least about 12 percent by weight of the extrudate rope filling, but the moisture level is preferably close to or less than 12 percent.

The shredded wheat biscuits usually have a very high moisture content, often 70 to 80 percent. The shredded cereal biscuits are dried at temperature below about 67° C. to reduce the moisture to below 12 percent, preferably about 7 to about 8 percent. The maintaining of the drying temperature at a relatively low temperature allows removal of the moisture while maintaining the debranched amylopectin in the crystalline state. Shredded cereal biscuits are usually dried at 200° F. or higher. The time for drying is usually 1 to 6 hours, but sufficient time is used for drying which facilitates using a temperature of less than 67° C.

The dried shredded wheat biscuits are baked and toasted in conventional equipment. Suitable ovens for baking and toasting the cut filled laminate include Proctor & Schwartz, Werner-Lehara, Wolverine and spooner ovens containing forced air and gas fired burners and a conveyor.

Temperature profiles used in the oven for baking and toasting of the biscuit preforms are generally within the range of about 200° F. to about 600° F. The total time for baking and toasting should be such so as to avoid browning. It depends upon the number of shred layers, the size of the shredded product, the filling, and the type of oven. The total time for baking and toasting typically ranges from about 5 minutes to about 10 minutes. The total time for baking and toasting should be such so as to avoid excessive browning. Suitable times for baking and toasting will depend upon matters such as product thickness, product size and oven type.

The baked product suitable has an average moisture content of less than 15 percent, preferably about 6 to about 12 percent, more preferably from about 7 to about 8 percent by weight, based upon the weight of the final product, as determined by a Karl-Fischer moisture analysis. The water activity of the baked product should be less than about 0.8, preferably less than about 0.6 when properly packaged. With proper packaging, the filling and the shredded cereal portions of the product reach equilibrium with respect to water activities within about two weeks.

The cereal portion of the filled biscuit can contain one or more additives at the usual levels of concentration. Exemplary thereof is a sugar such as sucrose, salt, malt, flavoring, food colorant, emulsifier, vitamins and/or minerals.

Rancid odors tend to accumulate if shredded wheat is stored in sealed containers. For this reason, shredded wheat product is sometimes packaged in boxes without outer or inner linings. When so packaged, the product is just as stable to storage deterioration as any other prepared cereal except that moisture absorption may occur in atmospheres of high relative humidity with a consequent loss of crispiness. In spite of these factors, an inner lining is usually used for boxes of shredded wheat which are commercially available. Antioxidants, such as, butylated hydroxytoluene, is usually added to the packaging material or coated on the inner surface of the packaging material of commercially available shredded wheat.

The shredded wheat of the invention secures significantly reduced oil oxidation and rancification without the presence of any antioxidant on or in the packaging material.

The solvent is not added during the preparation of the shredded wheat or applied before the baking of the shredded wheat.

The solvent used in the invention process of treating baked shredded wheat can be any potable solvent which is liquid preferably at room temperature and atmospheric pressure, and which is readily volatile at the desired operating temperature, preferably at room temperature, and the desired operating pressure, preferably at atmospheric pressure, leaving little or no solvent residue. The solvent must be non-toxic at the residue levels. Potable means food grade. The solvent is preferably an edible solvent. (The invention does not include the use of solvents which are carcinogenic, mutagenic or teratogenic.) Examples of useful solvents are hexane, methyl chloride, acetone and ethyl ether, but the preferred solvent is ethanol. Mixtures of solvents can be used. The lower alkanols ($C_1$ to $C_6$) are the preferred class of solvents. Water is not, a solvent within the scope of the invention because it is oleophobic. The solvents used in the invention must be oleophilic and anhydrous (containing no more than 5 percent of water).

The use of an anhydrous solvent also has the advantage of not having to dry the treated shredded wheat using elevated temperatures to lower the water content so as to prevent microbial growth and so as to secure the advantage of increased shelf stability provided by the invention process.

The preferred application method is the spraying of the solvent (most preferably in the form of a fine aerosol mist), but any other method, such as, sprinkling or pouring, can be used. The shredded wheat is not soaked with the applied solvent, but enough solvent is used to at least wet the shredded wheat in the regions below the surface. This allows the occurrence of the solvent-migration of the oils into the interior portions of the shredded wheat. The amount of alcohol used is typically 10 to 60 ml. of solvent per 100 grams of shredded wheat, preferably 20 to 50 ml. of solvent per 100 grams of shredded wheat and most preferably about 33.3 ml of solvent per 100 grams of shredded wheat. (It is best not to use so much solvent that un-sorbed solvent is left over after the contact step.)

The solvent contact step is preferably conducted at room temperature, but can be conducted at any higher or lower temperature at which the solvent is liquid and preferably readily volatile, and is preferably conducted at atmospheric pressure, but can be conducted at any higher or lower pressure at which the solvent is liquid and preferably readily volatile. The temperature at which the solvent contact step is performed is usually between 45° and 160° F. The pressure at which the solvent contact step is performed is usually between 0.1 and 3 atmospheres.

The contact or treatment time can be from about 1 minute to 24 hours or more, with the time preferably being that which is sufficient to completely wet surface regions of the shredded wheat with the solvent. The preferred contact time is about 5 minutes to about 1 hour. The contact step does not have to use closed containers which are impervious to ethanol vapor or other solvent vapor, but is conveniently used for the longer contact or treatment times.

The liquid solvent should not contain any water, that is, it should be completely anhydrous.

The solvent-treated shredded wheat is preferably exposed to the atmosphere to evaporate the solvent. When evaporation is conducted in this manner, the time required is normally about 12 hours to about 2 days. The solvent in the solvent-treated shredded wheat can be evaporated using suitable or conventional means, such as, by applying mild heat using a conventional drier with an exhaust fan. Elevated temperatures and elevated pressures, vacuum, etc., can be used to remove the volatile solvent. The evaporation time, regardless of the means for evaporation, should be sufficient to secure substantially complete evaporation or volatilization of the solvent (that is, to less than about one percent remaining of the sorbed solvent).

Ethanol can be substantially eliminated or removed from the shredded wheat by evaporation to leave virtually no residue. Ethanol is non-toxic and, therefore, even if it is not completely removed, the product is safe for human consumption.

The solvent (used to treat the shredded wheat) will evaporate to a degree during any time it might be kept in a sealed container, but the invention method preferably does not use a sealed container or packaging before the solvent has been substantially completely (99 percent plus) evaporated from the treated shredded wheat. To be marketable, a consumer does not want to open a box of shredded wheat and be faced with a strong or even slight odor of the solvent.

The solvent-treated shredded wheat has a water activity Aw of about 0.8 or less and has a water content of less than 15 percent, preferably 6 to 12 percent, more preferably from about 7 to about 8 percent, and at least about 6 percent. If the solvent contained any water, it may be necessary to heat or vacuum dry the solvent-treated shredded wheat after the solvent has been evaporated to achieve the required Aw and water levels. As carmelization due to heat is relatively undesirable in shredded wheat products, the solvent evaporation and any subsequent heating to remove moisture should be done at minimal temperature levels about room temperature. Since the product may pick up moisture during storage, the product should be packaged in air tight packaging to prevent loss of crispiness and to prevent loss of shelf stability (plus to keep out insects, etc.)

The invention process does not utilize contact of the solvent-treated shredded wheat with an atmosphere of superheated ethanol (or other solvent) to effect removal of the solvent from the solvent-treated shredded heat. Use of a superheated solvent atmosphere would be expensive and would require elaborate and expensive processing equipment.

The preservation ability resulting from the invention process does not require the treated shredded wheat to be kept in a sealed container containing an atmosphere of the solvent in gaseous form. The invention process removes the solvent by evaporation, so the treated shredded wheat does not provide an atmosphere of vaporized solvent when later placed in a container. The mechanism of the invention is believed to be the solvent-movement of oil in the surface regions into the interior of the shredded wheat.

The solvent-treated shredded wheat has improved shelf life and can be stored under ambient conditions for relatively long periods of time (without the use of a conventional antioxidant).

The evaporated solvent can be recovered and purified using any conventional or suitable procedure, and then reused in the invention process.

The invention treatment of the shredded wheat does not render the materials poisonous or unpalatable to consumers.

The invention process makes the treated baked shredded wheat substantially resistant to the development of rancidity, without changing the flavor, order or other desirable characteristics of the shredded wheat. The rate of rancidification of the product is very low. The invention product is nutritious, palatable and stable. The invention process is relatively inexpensive and simple in its requirements of manipulations and equipment. Shredded wheat treated by the process of the invention can be stored in packaging which has therein or thereon conventional antioxidants, such as, sorbic acid, potassium sorbate, propionic acid, butylated hydroxytoluene, butylated hydroxyanisole and sodium benzoate, but such antioxidants are not necessary. Also, it is not necessary to refrigerate the solvent-treated shredded wheat to secure improved shelf life.

The amount of ethanol applied during the ethanol treatment is controlled so as not to saturate or soak the entire baked shredded wheat biscuit. Accordingly, no problems of bleeding, solubilizing and the like arises with biscuits that have control filling or additives incorporated in the wheat structure. Sugar and other coatings can be placed on the shredded wheat biscuit after the ethanol treatment.

EXAMPLE 1

Use of Solvent Soak to retard Oxidation of Oil in Shredded Wheat

Preparation of Shredded Wheat

Commercial Spoon Size ® Shredded Wheat, that had not been exposed to an antioxidant, was obtained overnight from a bakery of Nabisco Brands Inc. The baked Shredded Wheat was ground into a powder for testing.

Solvent Soak Treatment

Into a four-ounce, glass jar containing 30 grams of the ground Shredded Wheat was mixed in 10 ml of ethyl ether, which completely saturated the wheat with the solvent. In another four-ounce, glass jar containing 30 grams of the grained Shredded Wheat was mixed with 10 ml of acetone, which completely saturated the wheat with the solvent. In each case, the solvent was allowed to evaporate from the uncapped jar by incubation overnight at room temperature. The sample jars were capped, incubated for one week at room temperature, then transferred to a 52° C. incubator for accelerated testing (as described below). A control consisted of ground Shredded Wheat treated as described above without any solvent.

Accelerated Shelf Life Test

The samples were incubated at 52° C. in capped jars to accelerate the rate of oxidation of the oil in the wheat. On a weekly basis, the samples were removed from the incubator, cooled to room temperature, a 2-gram aliquot removed for hexanal analysis, and the capped sample replaced into the incubator.

Hexanal Determination

The gas chromatographic method of Fritsch and Grale. J. Amer. Oil Chemists Soc., 54:225, (1977), was used to determine the concentration of hexanal in the wheat samples. The only modification in the method involved the use of 2-gram samples in septum sealed vials heated for 30 minutes at 90° C. to volatilize the hexanal for headspace sampling.

Results

The degree of rancidity in the Shredded Wheat was determined by hexanal concentration. It was organoleptically determined that hexanal values below 30 ppm were not detectable in the product, hexanal values between 30 to 40 ppm gave a slight rancid odor, and hexanal values at about 70 ppm gave a moderately strong rancid aroma to the wheat.

As shown in Table 1, the untreated Shredded Wheat was slightly rancid (40 ppm as hexanal) after one week and extremely rancid after two weeks (243 ppm of hexanal) under the accelerated testing conditions. Hexanal is caproic aldehyde. The acetone soak stabilized the wheat until the third week of testing when the sample developed a moderately strong rancid value of 73 ppm of hexanal. The ethyl ether stabilized the wheat for 6 to 8 weeks, when the wheat became moderately rancid with a hexanal value of 61 ppm. By way of comparison, Shredded Wheat stored at 52° C. with 50 ppm of BHT (butylated hydroxy toluene), the standard concentration used in the commercial product, is stable for about 10 weeks, i.e., the hexanal value is less than 30. At room temperature this product would be stable for 1.5 years. Clearly the solvent soak procedure gives a significant antioxidant protection to Shredded Wheat.

TABLE 1

Effect of Solvent Soak on Retarding Rancidity in Shredded Wheat

| Treatment | Week | | | | | | |
|---|---|---|---|---|---|---|---|
| | 1 | 2 | 3 | 4 | 6 | 8 | 10 |
| none | 40 | 243 | ND | ND | ND | ND | ND |
| Ethyl ether | 5 | 6 | 18 | 43 | 35 | 61 | 58 |
| Acetone | 24 | 21 | 73 | ND | 105 | ND | ND |

Note: ND means no data.

EXAMPLE 2

Use of Solvent Spray to Retard Oxidation of Oil in Shredded Wheat

Preparation of Shredded Wheat

In a covered container, 2 liters of deionized water was brought to a vigorous boil. Eight hundred grams of soft winter white wheat berries were added to the container and the reaction time started when water began to reboil. After 30 minutes the berries were drained on a 20-mesh screen and the surface water removed by blotting the berries with paper towels. The berries were placed into a plastic bag and stored at room temperature to temperature. After 18 hours, the berries were shredded into 8-layered stacks using a commercial single headed shredder. A manual spoon-size biscuit former was used to form 8-layered wafers (approximately a 3×4 inch rectangle) containing nine spoon-sized biscuits. A total of 18 wafers were made. Each wafer had a weight of about 19 grams. The wafers were baked in a small band oven with each of the six baking zones at 380° F. Each wafer was passed through the oven a total of six times; twice at a speed of 30 (90 seconds residence timed), twice at a speed of 40 (72 seconds residence time) and twice at a speed of 50 (60 seconds residence time). The wafers were allowed to cool to room temperature, and immediately treated with solvent.

Solvent Treatment

In a chemical hood, both the front and back of a given wafer was sprayed with a given solvent. The regent grade solvents used were: alcohol (200-proof, potable ethanol), acetone, ethyl ether, hexane and methyl chloride. Approximately 25 ml of a given solvent was sprayed into each wafer using a fine aerosol mist sprayer (of the type used for spraying thin layer chromatography plates; the sprayer was obtained from Anspec Company Inc., Ann Arbor, Mich., Cat. #W549). In all cases, the solvent was retained within the wafer and no solvent was observed flowing from the wafer. Three wafers were treated per solvent, each was placed in the hood to air dry approximately 1 hour at room temperature and then was transferred to capped, quart jars. A control consisted of three wafers which did not receive any solvent treatment.

Accelerated Shelf Life Test

The samples in capped Mason jars were placed in a 126° F. incubator. At weekly intervals, the samples were removed, allowed to cool to room temperature, opened and organoleptically evaluated for rancidity by laboratory personnel. Samples which were not rancid were sealed and returned to the incubator for further testing.

Results

After two weeks at 126° F., the Shredded Wheat control was found to be rancid while all of the solvent treated Shredded Wheat samples remained non-rancid. On the third week of testing there was perhaps a very slight rancid odor in the solvent treated samples. By the fourth week of testing all of the solvent treated samples were rancid. Thus, the solvent treatment extends the shelf life of the Shredded Wheat at elevated temperature by two weeks. All of the solvents produced the same result, suggesting that surprisingly this is a general solvent phenomenon. The two week increase in shelf stability at the accelerated test temperature corresponds to approximately a sixteen week increase at room temperature.

As a result of testing various natural compounds for antioxidant activity, a novel means of retarding oxidation and subsequent rancidification of oil in Shredded Wheat has been discovered. The process involves treatment of baked Shredded Wheat with a simple solvent spray utilizing such solvents as potable ethyl alcohol. While not wishing to be bound by any particular theory, it is believed that the retardation of the oxidation of the oil is caused by solvent-induced migration of the oil from the surface to the interior of the shreds.

What is claimed is:

1. Process for increasing the shelf life of baked shredded wheat, comprising:
   (a) treating the baked shredded wheat with a sufficient amount of a potable, anhydrous, oleophilic solvent to at least wet the regions below the surface of the baked shredded wheat, the solvent being liquid at room temperature and atmospheric pressure; and (b) evaporating the solvent from the shredded wheat, whereby the rate of the rancidification of the oil in the shredded wheat is significantly decreased.

2. Process as claimed in claim 1 wherein the step (a) occurs between 45° and 160° F. and 0.1 and 3 atmospheres.

3. Process as claimed in claim 2 wherein the solvent is a lower $C_1$–$C_6$ alkanol.

4. Process as claimed in claim 3 wherein, in step (a), the amount of alkanol used is 10 to 60 ml per 100 grams of shredded wheat.

5. Process as claimed in claim 4 wherein the alkanol is ethanol.

6. Process as claimed in claim 1 wherein the solvent is a lower $C_1$–$C_6$ alkanol, hexane, methyl chloride, acetone and ethyl ether.

7. Process as claimed in claim 1 wherein the solvent is ethyl ether, acetone, hexane or methyl chloride.

8. Process as claimed in claim 3 wherein step (a) has a duration of about 5 minutes to about 1 hour.

9. Process as claimed in claim 3 wherein the solvent is sprayed onto the shredded wheat.

10. Process as claimed in claim 3 wherein the solvent is evaporated from the shredded wheat by exposure of the shredded wheat to the atmosphere.

11. Process as claimed in claim 3 wherein the solvent is evaporated from the shredded wheat by heating the shredded wheat.

12. Process as claimed in claim 3 wherein the solvent is evaporated from the shredded wheat by vacuum drying the shredded wheat.

13. Process as claimed in claim 3 wherein less than one percent of the solvent remains after step (b).

14. Baked shredded wheat having increased shelf life, which has been subjected to the process of claim 1.

15. Process of preserving shredded wheat against oxidation and rancidification of the oil therein, comprising:
 (a) treating the baked shredded wheat with a sufficient amount of a potable anhydrous, oleophilic solvent to at least wet the regions below the surface of the baked shredded wheat, the solvent being liquid at room temperature and atmospheric pressure; and
 (b) evaporating the solvent from the shredded wheat.

16. Process as claimed in claim 15 wherein step (a) occurs between 45° and 160° F. and 1 and 3 atmospheres, and the solvent is a lower $C_1$–$C_6$ alkanol.

17. Process as claimed in claim 15 wherein the solvent is ethanol.

18. Process as claimed in claim 15 wherein the solvent is sprayed onto the shredded wheat.

19. Process as claimed in claim 15 wherein the solvent is evaporated from the shredded wheat by exposure of the shredded wheat to the atmosphere, or is evaporated from the shredded wheat by heating the shredded wheat.

20. Process for increasing the shelf life of baked shredded farinaceous cereal, comprising:
 (a) treating the baked shredded wheat with a sufficient amount of a potable, anhydrous, oleophilic solvent to at least wet the regions below the surface of the baked shredded cereal, the solvent being liquid at room temperature and atmospheric pressure; and
 (b) evaporating the solvent from the shredded wheat.

21. Process as claimed in claim 20 wherein the solvent is ethanol.

22. Process as claimed in claim 20 wherein the solvent is ethyl ether, acetone, hexane or methyl chloride.

23. Process as claimed in claim 20 wherein the solvent is a lower $C_1$–$C_6$ alkanol.

24. Process as claimed in claim 20 wherein the solvent is sprayed onto the shredded cereal.

25. Process as claimed in claim 20 wherein the solvent is evaporated from the shredded cereal by exposure of the shredded cereal to the atmosphere.

26. Process as claimed in claim 20 wherein the solvent is evaporated from the shredded cereal by heating the shredded cereal.

27. Baked shredded farinaceous cereal having increased shelf life, which has been subjected to the process of claim 20.

* * * * *